United States Patent
Herm et al.

(10) Patent No.: US 10,682,604 B2
(45) Date of Patent: *Jun. 16, 2020

(54) METHOD AND REGENERATIVE SEPARATING APPARATUS FOR SEPARATING CONTAMINANTS FROM PROCESS EXHAUST AIR

(71) Applicant: DÜRR SYSTEMS AG, Bietigheim-Bissingen (DE)

(72) Inventors: Enrico Herm, Mötzingen (DE); Erhard Rieder, Herrenberg (DE); Christian Eichhorn, Bietigheim-Bissingen (DE)

(73) Assignee: DÜRR SYSTEMS AG, Bietigheim-Bissingen (DE)

( * ) Notice: Subject to any disclaimer, the term of this patent is extended or adjusted under 35 U.S.C. 154(b) by 105 days.

This patent is subject to a terminal disclaimer.

(21) Appl. No.: 16/059,839

(22) Filed: Aug. 9, 2018

(65) Prior Publication Data
US 2018/0345205 A1    Dec. 6, 2018

Related U.S. Application Data

(63) Continuation-in-part of application No. 15/510,452, filed as application No. PCT/EP2015/070456 on Sep. 8, 2015, now Pat. No. 10,286,354.

(30) Foreign Application Priority Data

Sep. 12, 2014  (DE) .................. 10 2014 218 344

(51) Int. Cl.
*B01D 53/06* (2006.01)
*B01D 53/04* (2006.01)

(52) U.S. Cl.
CPC ......... *B01D 53/06* (2013.01); *B01D 53/0446* (2013.01); *B01D 2253/102* (2013.01);
(Continued)

(58) Field of Classification Search
CPC .............. B01D 53/0446; B01D 53/06; B01D 2253/102; B01D 2253/108;
(Continued)

(56) References Cited

U.S. PATENT DOCUMENTS 4,863,497 A * 9/1989 Grenier .................. B01J 8/0214
                                                                96/123
4,948,392 A    8/1990 Rush
(Continued)

FOREIGN PATENT DOCUMENTS

DE    3935094 A1    4/1991
EP    0343284 A1    11/1989
(Continued)

*Primary Examiner* — Frank M Lawrence, Jr.
(74) *Attorney, Agent, or Firm* — Greer, Burns & Crain, Ltd.

(57) ABSTRACT

A method for separating impurities from process exhaust air is provided and includes the steps of passing a process exhaust air through a separating device comprising a separation unit, regenerating the separating device by passing a regeneration stream therethrough, where outer lateral surfaces of the separation unit are continuously loaded by the process exhaust air and the regeneration stream, dividing the regeneration stream passing through the separating device during regeneration into a first partial stream having an impurity concentration less than a first predetermined limit, and a second partial stream having an impurity concentration equal to or greater than a second predetermined limit, where the second predetermined limit is equal to or greater than the first predetermined limit, returning the first partial stream generated during regeneration to the separating device and directing the second partial stream generated during regeneration to a cleaning device.

16 Claims, 6 Drawing Sheets

(52) U.S. Cl.
CPC .. *B01D 2253/108* (2013.01); *B01D 2257/708* (2013.01); *B01D 2258/0258* (2013.01); *B01D 2258/06* (2013.01); *B01D 2259/4009* (2013.01)

(58) Field of Classification Search
CPC ........ B01D 2257/704; B01D 2257/708; B01D 2258/0258; B01D 2258/06; B01D 2259/4009; F24F 3/1423; F24F 2203/1032
USPC ..... 95/107, 113, 115, 148; 96/125, 144, 146
See application file for complete search history.

(56) References Cited

U.S. PATENT DOCUMENTS

| | | | |
|---|---|---|---|
| 5,169,414 A * | 12/1992 | Panzica | B01D 53/0431 95/113 |
| 5,659,974 A | 8/1997 | Graeff | |
| 6,199,392 B1 | 3/2001 | Maeda | |
| 6,328,787 B1 | 12/2001 | Yamauchi | |
| 9,322,414 B2 | 4/2016 | Eckert | |
| 9,643,119 B2 | 5/2017 | Holler et al. | |
| 10,286,354 B2 * | 5/2019 | Herm | B01D 53/0446 |
| 2011/0209613 A1 * | 9/2011 | Jensen | B01D 53/06 95/113 |
| 2014/0000457 A1 * | 1/2014 | Barclay | B01D 53/06 95/107 |
| 2015/0362195 A1 | 12/2015 | Widenhorn et al. | |

FOREIGN PATENT DOCUMENTS

| | | |
|---|---|---|
| JP | H08155252 A | 6/1996 |
| JP | 2001310110 A | 11/2001 |
| JP | 2011031159 A | 2/2011 |
| JP | 2012135761 A | 7/2012 |

\* cited by examiner

METHOD AND REGENERATIVE SEPARATING APPARATUS FOR SEPARATING CONTAMINANTS FROM PROCESS EXHAUST AIR

RELATED APPLICATION

This patent application is a Continuation-In-Part of the patent application U.S. Ser. No. 15/510,452 filed on Mar. 10, 2017, now pending, claiming the benefit of international patent application no. PCT/EP2015/070456 filed on Sep. 8, 2015.

BACKGROUND

The present invention relates to a method and a regenerative separation device, in particular a filter device, for separating impurities from process exhaust air, for example for separating organic solvents from solvent-containing process exhaust air, for example for use in an industrial surface treatment plant.

Cleaning of process exhaust air having low concentration or loading of at least one combustible subcomponent, in particular of organic solvents, such as paint exhaust air such as it is incurred, for example, in painting plants of vehicle bodies, is for example carried out by means of a method for up-concentrating. Here, the volatile organic solvents are physically attached (adsorption, absorption) to a separation unit, in particular a filter of a separating device. This process can be reversed (desorption) by increasing the temperature of the filter.

For the desorption process, for example, hot air of 140 to 450° C. having a low flow rate is used. The hot air exiting the separating device, in particular filtering device, after passing through the separating unit, in particular the filter, is also referred to as a concentrate air. The concentration of solvent in the concentrate air increases in the same proportion as the flow rate is reduced, compared to the process exhaust air. With conventional systems, increases of concentration in the concentrate air in a ratio of 2:1 to 20:1 in relation to the process exhaust air can be achieved. The limits of this up-concentration result from reaching a lower explosive limit and exceeding the ignition temperature. The concentrate air finally can be fed to a cleaning device to extract or recover the solvents.

Such a method for separating organic solvents from solvent-containing process exhaust air is disclosed for example in DE 39 35 094 C2. In this conventional method, a continuously operated separating device, in particular filtering device, comprising separation unit, in particular a filter, designed as a rotor is used whose end faces are continuously loaded by process exhaust air and hot air. Here, the separating device, in particular filtering device, is divided into a sector-shaped separation zone and a sector-shaped regeneration zone which are passed by the rotating separation unit, in particular the rotating filter, continuously one after the other.

As the region of the filter entering the regeneration zone initially is still on the temperature level of the attaching process of, for example, about 10 to 60° C., and has to be heated by the hot air on, for example, about 140 to 450° C., the temperatures of the filter are not sufficient to desorb the attached solvents in the first subportion of the filter, in a first phase of the regeneration process. This may result in that the solvent concentration in the concentrate air and the efficiency of the downstream cleaning device are insufficient or reduced.

Therefore, it is an object of the invention to provide a method and a regenerative separating device, in particular filtering device, for separating impurities from process exhaust air which enable greater efficiency.

SUMMARY

The inventive method for separating impurities from process exhaust air includes the steps of passing the process exhaust air through a separating device, in particular filtering device filter; regenerating the separating device, in particular filtering device, by passing a regeneration stream therethrough; dividing the regeneration stream passing through the separating device, in particular filtering device, during regeneration into a first partial stream having an impurity concentration less than a first predetermined limit, and a second partial stream having an impurity concentration equal to or greater than a second predetermined limit, the second predetermined limit being equal to or greater than the first predetermined limit; returning the first partial stream generated during regeneration to the separating device, in particular filtering device; and directing the second partial stream generated during regeneration to a cleaning device.

In this method, a portion of the regeneration stream having a comparatively low concentration of impurities, is branched off as the first partial stream ("split stream") and returned to the separating device, in particular filtering device. The efficiency of the cleaning device to which the second partial stream is fed can be increased by the up-concentration of the impurities in the second partial stream ("concentrate stream") of the regeneration stream achieved in that way. Further, the concentration of impurities in the separating device, in particular filtering device, and thus also the up-concentration in the second partial stream of the regeneration stream can be increased by returning the first partial stream back to the separating device, in particular filtering device, so that the efficiency of the cleaning device can be improved as a whole. With the inventive method, high up-concentrations or up-concentration factors can be achieved, which can usually only be achieved with two-stage filtering devices (e.g. up to 40:1 and more).

Due to the high up-concentrations or up-concentration factors, the inventive method is particularly suited for cleaning of process exhaust air having low concentration or loading of impurities. The method, however, is also suited in an advantageous manner for process exhaust air streams having higher concentrations of impurities, in particular combustible subcomponents, where the concentrations resulting in the second partial stream at their up-concentration are above the lower explosive limit (LEL) of, for example, 25%. This second partial stream may then preferably directly without additional equipment be cleaned in a simple cleaning device such as e.g. an (atmospheric) torch or a suited cracking burner. In this application, branching off the first partial stream increases the impurity concentration in the second partial stream so that the efficiency of e.g. the torch can be improved.

The first partial stream having the lower impurity concentration is formed for example during a first or early stage of regenerating the separating device, in particular filtering device, when the separating device, in particular filtering device, still has a low temperature level and for this reason only few impurities detach from the separation unit, in particular the filter. In this case, the first partial stream has not only a relatively low impurity concentration but also a lower temperature. On the other hand, the second partial stream is formed, for example, during a second phase of regenerating the separating device, in particular filtering device, when the separating device, in particular filtering device, has reached a higher temperature level. In this case, the second partial stream has not only a higher impurity concentration, but also a higher temperature. On the other hand, the second partial stream having the higher impurity concentration can also be produced already at an early stage of regenerating if, for example, a very rapid heating of the separating device, in particular filtering device, is performed, and in this case, the first partial stream having the lower impurity concentration can be produced at a late stage of regenerating if, for example, a (longer) cooling phase the separating device, in particular filtering device, is required. In both variants, due to the higher temperature of the second partial stream fed to the cleaning device, the efficiency thereof can be increased. If necessary, the cleaning device can be operated auto-thermally (i.e. without additional energy supply) or even with excess energy, whereby the energy demand of the entire system can be optimized.

By branching off and returning the first partial stream, a time integration of a potentially variable flow rate of the regeneration stream at a given, possibly even temporally fluctuating impurity concentration of the process exhaust air over a given, possibly if applicable variable time interval during the phase of up-concentration and a regeneration phase split into two sub-phases can be achieved in total. The regeneration phase is distinguished by a reduced flow rate, while the sub-phases differ especially with regard to their respective impurity concentration.

In principle, the invention can be advantageously used in all cases of cleaning exhaust gases/exhaust airs loaded with oxidizable pollutants, especially with low concentrations of pollutants. In this connection, the term process exhaust air in particular shall be understood as an exhaust gas and/or an exhaust air of at least one upstream process or upstream source including a loading or concentration of impurities. The impurities are, for example, at least one combustible sub-component such as a volatile organic component (VOC) of the exhaust gas or exhaust air. The process exhaust air can be in particular a solvent-containing process exhaust air, which has a loading/concentration of an organic solvent (e.g. painting industry). In addition, the process exhaust air can also be mine gases (i.e. VAM=ventilation air methane), exhaust airs from biogas or waste incineration plants not being up-concentratable otherwise, air from printing plants or plastics processing factories being loaded with small amounts of VOC, and the like.

The separating device, in particular filtering device, preferably comprises a separation unit, in particular filter, at which the impurities contained in the process exhaust air (e.g. organic solvents) can be physically attached when passing therethrough. The separation unit is preferably configured as an adsorption filter, an absorption filter or the like. For this purpose, the separation unit, in particular filter, preferably includes activated carbon, zeolite or other suited filter material.

The regeneration stream preferably is hot air, preferably in a temperature range of about 140 to 450° C. Preferably, the regeneration stream passes through the separating device, in particular filtering device, or the separation unit, in particular filter, thereof in a direction opposite to the direction in which the process exhaust air is passed through the separating device, in particular filtering device.

In this context, the term concentration shall be any type of a content specification relating to the volume of a mixture (DIN 1310). Thus, in this context, the term concentration includes especially a molar concentration (molarity), an equivalent concentration (normality), a mass concentration, a volume concentration and a particle concentration (particle density).

The first partial stream of the regeneration stream has an impurity concentration smaller than a first predetermined limit, i.e. a relatively low impurity concentration. The first predetermined limit is preferably selected such that the impurity concentration of the first partial stream flow is that of the process exhaust air at maximum. The second partial stream of the regeneration stream has an impurity concentration equal to or greater than a second predetermined limit, i.e. a middle or higher impurity concentration. The second predetermined limit is preferably selected such that the impurity concentration of the second partial stream exceeds that of the process exhaust air.

In a preferred configuration of the method or the separating device, in particular filtering device, according to the invention, an input concentration or loading of impurities, in particular at least one combustible sub-component such as a volatile organic component (VOC), of the incoming process exhaust air is lowered during passage through the separating device, in particular filtering device, so that an output concentration in the outgoing process exhaust air complies with at least the legal or normative requirements related to these impurities for emitting the process exhaust air into environment, or can at least not be perceived as disturbing in the environment any longer, in the event that no legal requirements for the corresponding kind of impurity have to be met.

In a particularly preferred variant, the first predetermined limit of an impurity concentration in the first partial stream of the regeneration stream is less than the input concentration in the incoming process exhaust air. Furthermore, the second predetermined limit of an impurity concentration in the second partial stream of the regeneration stream preferably can be higher than the input concentration in the incoming process exhaust air, in particular, a ratio of the second limit of the impurity concentration in the second partial stream or at least of the impurity concentration in the second partial stream itself relative to the input concentration can be between 2:1 and 40:1, preferably between 10:1 and 30:1, preferably at least 20:1.

In this context, the cleaning device is a device adapted to extract or recover the impurities from the second partial stream of the regeneration stream. The cleaning device is preferably configured for regenerative thermal oxidation (RTO), direct thermal oxidation (TO), recuperative catalytic oxidation (CO), regenerative catalytic oxidation (RCO), condensation or the like, or comprises a gas turbine aggregate having a combustion apparatus for combusting the second partial stream or the combustible impurities contained therein. The regeneration stream can form a closed or open regeneration circuit, together with the second partial stream and the cleaning device.

The gas turbine aggregate is preferably a micro gas turbine aggregate as it is disclosed for example in DE 10 2013 203 448 A1. The construction and the operation are fully incorporated by reference to this earlier patent application.

In a preferred configuration of the invention, a flow amount of the first partial stream generated during regeneration is variably controlled. Preferably, a ratio of the flow amount of the first partial stream generated during regeneration to the flow amount of the second partial stream generated during regeneration is variably controlled. In this way, the up-concentration and the temperature of the second partial stream of the regeneration stream can be optimized, and thus the efficiency of the cleaning device can be increased. Preferably, the flow amount or the flow amount ratio of the first partial stream of the regeneration stream are controlled so that the cleaning device can be operated auto-thermally, i.e. without additional energy supply. Preferably, the control of the first partial stream is performed in dependence on a temperature of the first partial stream, an impurity concentration of the first partial stream, a temperature of the second partial stream, an impurity concentration of the second partial stream, a temperature of the process exhaust air, an impurity concentration of the process exhaust air, a flow volume of the process exhaust air, a temperature of the regeneration stream, a flow volume of the regeneration stream and/or an energy balance of the cleaning device.

In a preferred configuration of the invention, the first partial stream generated during regeneration is fed into the process exhaust air upstream of the separating device, in particular filtering device. In this way, the impurity concentration of the process exhaust air and also the second partial stream can be increased so that the efficiency of the cleaning device can be further improved. Alternatively or additionally, it is also possible to introduce the first partial stream generated during regeneration directly into the separating device.

In another preferred configuration of the invention, the separating device, in particular filtering device, is cooled between the regeneration and the next cleaning of the process exhaust air by means of a cooling air flow. After a regeneration process, it is advantageous to cool down the separating device, in particular filtering device, from the temperatures having been elevated for regeneration to a temperature range suited for attaching the impurities.

In this configuration, the first partial stream generated during regeneration can preferably also be fed into the cooling air flow upstream of the separating device, in particular filtering device. In this way, the impurity concentration in the separating device, in particular filtering device, and thus also of the second partial stream can be increased so that the efficiency of the cleaning device can be further improved.

In another preferred configuration of the invention, a further partial stream is branched off from the second partial stream generated during regeneration and returned to the separating device, in particular filtering device. This branched-off further partial stream is preferably fed into the first partial stream, the process exhaust air and/or the regeneration stream. In this way, the impurity concentration in the separating device, in particular filtering device, and thus also of the second partial stream can be further increased so that the efficiency of the cleaning device can be further increased.

In yet another preferred configuration of the invention, the separating device, in particular filtering device, is operated continuously. For this purpose, the separating device, in particular filtering device, preferably comprises a rotating (e.g. disc-shaped) separation unit, in particular filter, which passes the areas of the separating device, in particular filtering device, for filtering, regenerating and, if existing, cooling continuously one after the other.

Preferably, a rotor-type separating device or a carousel-type separating device is used as the separating device.

The regenerative separating device, in particular filtering device, for separating impurities from process exhaust air according to the invention comprises: a port for introducing process air; a separation unit, in particular filter, for receiving the impurities from the process exhaust air introduced into the separating device, in particular filtering device; a port for discharging clean air; a port for introducing a regeneration stream; a dividing means for dividing the regeneration stream passed through the separation unit, in particular filter, into a first partial stream having an impurity concentration less than a first predetermined limit, and a second partial stream having an impurity concentration equal to or greater than a second predetermined limit, wherein the second predetermined limit is equal to or greater than the first predetermined limit; a port for discharging the first partial stream; and a port for discharging the second partial stream.

With regard to the advantages which can be achieved by this separating device, in particular filtering device, and the definitions of terms, reference is made to the above explanations in connection with the method according to the invention, which apply equivalently to the separating device, in particular filtering device.

In a preferred configuration of the invention, the dividing means is configured designed such that it can control a flow amount of the first partial stream variably. Preferably, the dividing means is configured so that it can control a ratio of the flow amount of the first partial stream generated during regeneration to the flow amount of the second partial stream generated during regeneration variably. For this purpose, the dividing means preferably comprises an adjustable partition wall, an adjustable flow regulator or the like.

In a preferred configuration of the invention, the separation unit, in particular the filter, is designed as a rotor whose end faces can be continuously loaded by the process exhaust air and the regeneration stream. The separation unit, in particular filter, is preferably formed disc-shaped. The axial orientation of the rotor is in principle freely selectable, preferably it is substantially horizontally or substantially vertically.

In an alternative preferred configuration of the invention, the separation unit, in particular the filter, is designed as a carousel whose outer lateral surfaces can be continuously loaded by the process exhaust air and the regeneration stream. The separation unit, in particular filter, is preferably formed cylindrical or prismatic (e.g. as n-gonal prism). The axial orientation of the carousel is in principle freely selectable, preferably it is substantially vertically or substantially horizontally.

In the rotor-type configuration, the separating device, in particular filtering device, preferably comprises a sector-shaped separation or filter zone and a sector-shaped regeneration zone, wherein the separation zone and the regeneration zone do not overlap. In the carousel-type configuration, the separating device, in particular filtering device, preferably comprises a circular or polygonal ring segment-shaped separation or filter zone and a circular or polygonal ring segment-shaped regeneration zone, wherein the separation zone and the regeneration zone do not overlap. The separation zone is preferably connected to the port for introducing process air and the port for discharging clean. The regeneration zone is preferably connected to the port for introducing a regeneration stream, the port for discharging the first partial stream and the port for discharging the second partial stream. The ratio of the area of the regeneration zone to the area of the separation zone is preferably in a range from about 5% to about 25%, more preferably from about 10% to about 15%.

In addition, in these afore-mentioned configurations, it is preferably provided that the dividing means divides the regeneration zone into a first subzone and a second subzone in a direction of rotation or a circumferential direction of the separation unit, in particular filter. The first subzone of the regeneration zone is preferably connected to the port for introducing a regeneration stream and the port for discharging the first partial stream, and the second subzone is preferably connected to the port for introducing a regeneration stream and the port for discharging the second partial stream. The areal ratio of the first subzone to the second subzone is preferably adjustable by the dividing means. The area of the first subzone is preferably at most about 40%, more preferably about 30% at maximum or about 20% at maximum, of the area of the regeneration zone.

In another preferred configuration of the invention, the separating device, in particular filtering device, further comprises a port for introducing a cooling air flow and a port for discharging the cooling air flow after passing through the separation unit, in particular filter.

In this configuration, the separating device, in particular filtering device, preferably has a sector-shaped cooling zone, which is arranged between the regeneration zone and the separation zone, in a direction of rotation of the separation unit, in particular filter. This cooling zone is preferably connected to the port for introducing a cooling air flow and the port for discharging the cooling air flow after passing through the separation unit, in particular filter.

Further, subject-matter of the present invention is a system for separating impurities from process exhaust air, for example for separating organic solvents from solvent-containing process exhaust air, which comprises an above-described regenerative separating device, in particular filtering device, according to the invention as well as a cleaning device for extracting or recovering the impurities from the second partial stream generated during a regeneration process of the separating device, in particular filtering device. This system is also especially suited for carrying out the above-described method according to the invention.

In a preferred configuration of the invention, the system further comprises a flow line for returning the first partial stream generated during a regeneration process to the separating device, in particular filtering device. The flow line is preferably configured and arranged to introduce the first partial stream into the process exhaust air, into the cooling air flow and/or into the separation/filter zone of the separating device, in particular filtering device.

In another preferred configuration of the invention, the system further comprises a flow controller for branching off a further partial stream from the second partial stream generated during a regeneration process, and at least one further flow line for returning the further partial stream to the separating device, in particular filtering device. The flow controller preferably comprises a multi-way valve, a flow switch or the like. The further flow line is preferably configured and arranged to introduce the branched-off further partial stream into the regeneration stream, into the first partial stream and/or into the process exhaust air.

The above-described method of the invention, the above described regenerative separating device, in particular filtering device, of the invention and the above-described system of the invention can be used in a particularly advantageous manner in industrial surface treatment plants for treating a surface of a workpiece. Preferably, they can be used in painting plants for painting vehicle parts such as in particular vehicle bodies, in which the organic solvent shall be separated from the painting exhaust air. Moreover, the present invention can be used advantageously in all cases of cleaning exhaust gases/exhaust airs loaded with oxidizable pollutants such as for mine gas, exhaust airs from biogas or waste incineration plants not being up-concentratabe otherwise, air from printing plants or plastics processing plants loaded with small amounts of VOC, and the like.

BRIEF DESCRIPTION OF THE DRAWINGS

The above and further advantages, features and possible applications of the invention will become more apparent from the following description of various embodiments with reference to the accompanying drawings. In which, for the most part schematically.

DETAILED DESCRIPTION

Figure 1:
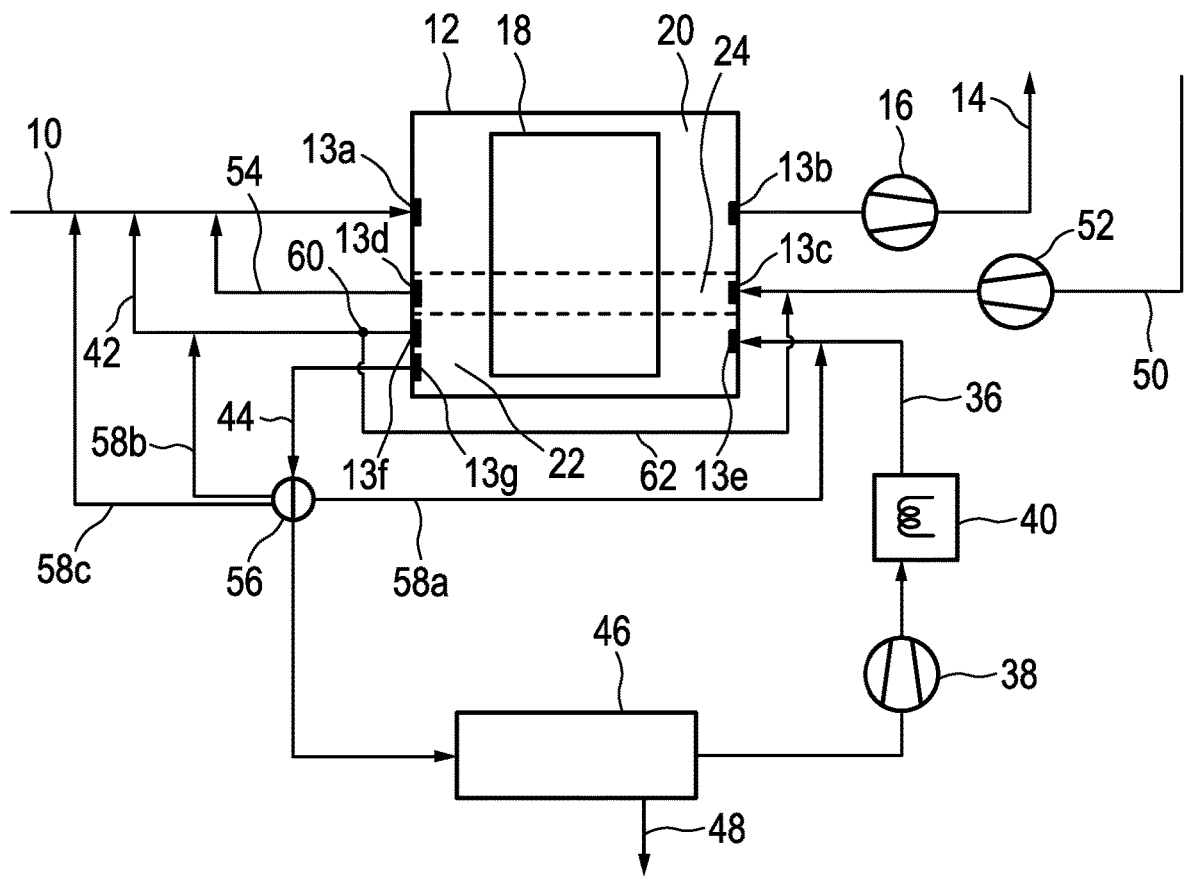
FIG. 1 shows the structure of a system according to an embodiment of the invention in different variants.
Figure 2:
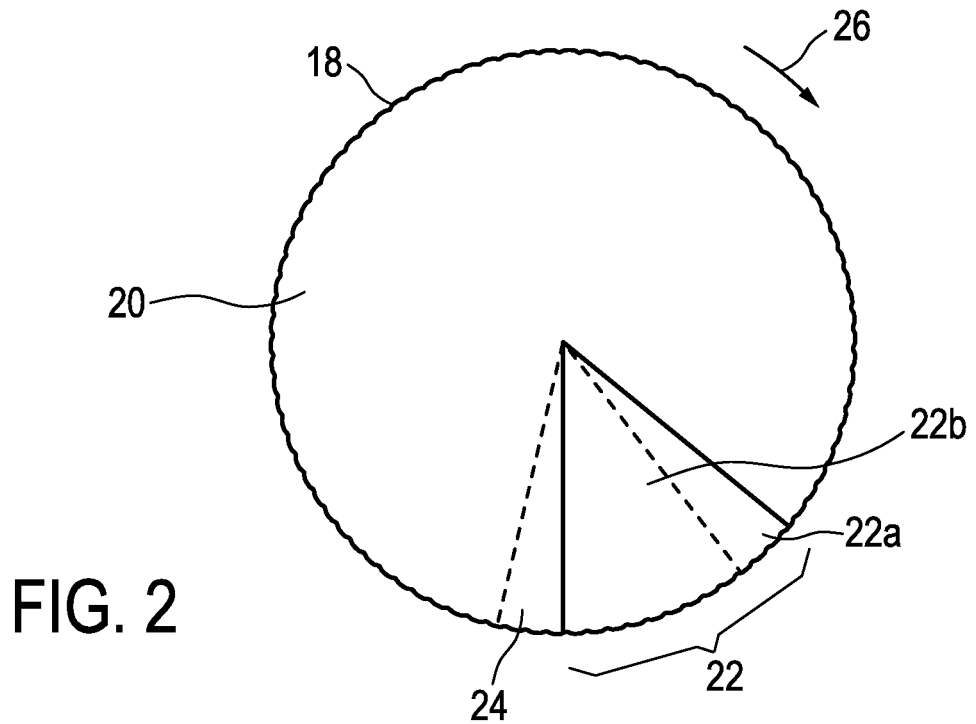
FIG. 2 is a simplified representation of a filter designed as a rotor of an inventive separating device, in particular filtering device, according to a preferred embodiment.
Figure 3:
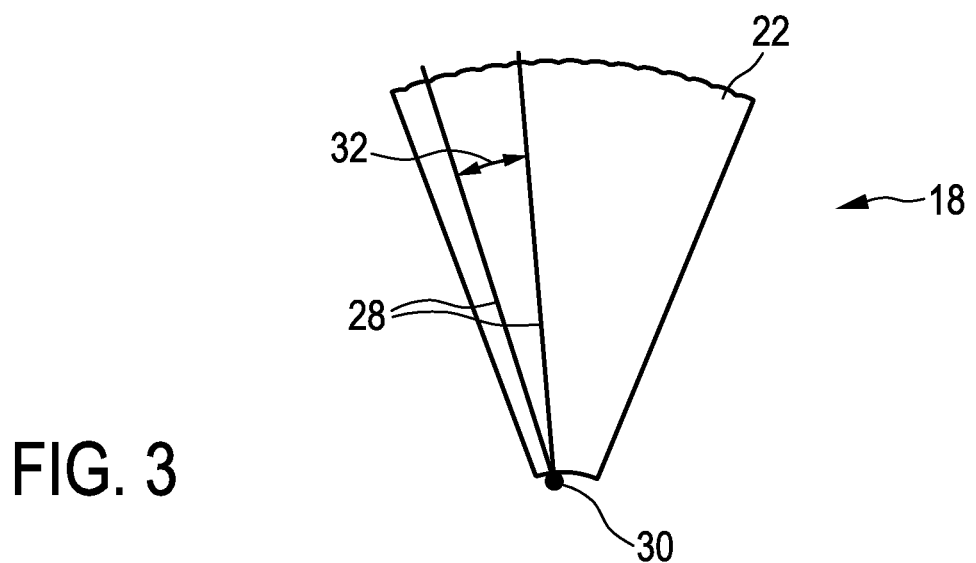
FIG. 3 is a simplified representation of a dividing means of an inventive separating device, in particular filtering device, according to a preferred embodiment.

Referring to FIG. 1, various variants of the construction of an inventive system for separating impurities from process exhaust air are explained in more detail. Referring to FIGS. 2 and 3, the construction and operation of the separating device, in particular filtering device, of such a system are described in more detail.

For separating impurities (e.g. organic solvents), the process exhaust air (e.g. solvent-containing painting exhaust air) 10 is directed to a separating device 12 via a port 13a. The process exhaust air cleaned in the separating device is discharged via a port 13b and output for example into the environment by a blower 16 as so-called clean air 14, or returned back to the process.

The separating device 12 comprises a separation unit 18, in particular a filter, to which the impurities contained in the process exhaust air 10 are attached when passing through the separating device 12. The separation unit 18 of the separating device 12 is formed for example as an adsorption filter, an absorption filter or the like, and includes for example activated carbon as filter material. The separation unit 18 can be regenerated by means of elevated temperatures for performing a desorption process.

As indicated in FIG. 2, in this embodiment, the separation unit 18 is configured as a disc-shaped rotor. The separating device 12 comprises a separation zone 20 and a regeneration zone 22, which are each configured sector-shaped, with the area of the regeneration zone 22 being dimensioned distinctly smaller than the area of the separation zone 20. The disc-shaped rotor preferably has a substantially horizontal or substantially vertical axial orientation.

The separating device 12 is operated continuously. I.e. the separation unit 18 passes the separation zone 20 and the regeneration zone 22 continuously one after the other in a direction of rotation 26.

As shown in FIG. 2, the regeneration zone 22 is divided into a first subzone 22a and a second subzone 22b in the direction of rotation 26 of the separation unit 18. Here, the area of the first subzone 22a is dimensioned significantly smaller than the area of the second subzone 22b. As illustrated in FIG. 3, a subdivision between the first and the second subzones 22a, 22b is formed by a dividing means 28 in the form of a partition wall. This dividing means 28 is mounted on a bearing 30 being pivotable about a predetermined swivel range 32. By swiveling the dividing means 28, an areal ratio between the first and second subzones 22a, 22b of the regeneration zone 22 can be adjusted variably.

Thus, FIG. 3 shows a separation unit 18 with a relatively simply constructed, mechanical dividing means 28 which is pivotally mounted on a bearing 30 in the end region. The bearing 30 is coupled e.g. to a drive which can be controlled for example by an average output temperature of the first and/or the second partial streams 42, 44 with regard to the output area.

Figure 5:
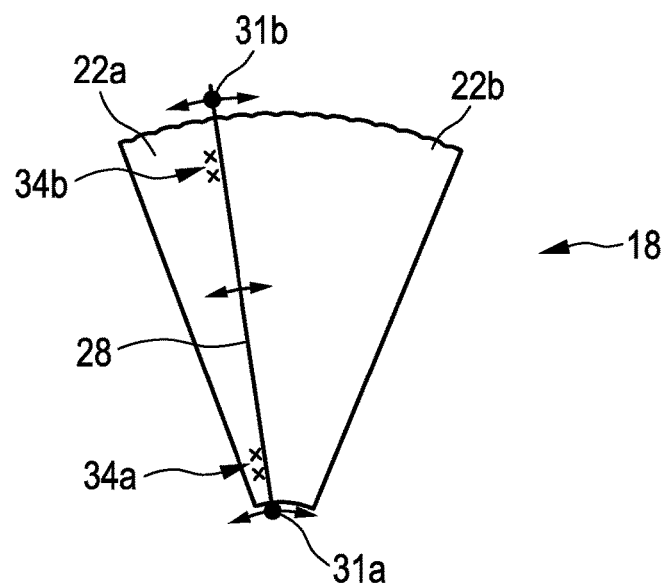
FIG. 5 is a simplified representation of a dividing means of an inventive separating device, in particular filtering device, according to another preferred embodiment.

FIG. 5 shows another embodiment of a dividing means 28 for the separation unit 18 of the separating device 12. In this embodiment, the dividing means 28 in the form of a partition wall is supported at its two end portions (top and bottom in FIG. 5) movably or displaceably. The two bearings 31a, 31b each are coupled to a drive and are preferably controllable independently from each other. In addition, preferably a plurality of (preferably at least two, more preferably at least four) temperature sensors 34a, 34b are provided along the dividing means 28 to detect the outlet temperatures of the first and/or the second partial streams 42, 44 as control parameters for the dividing means 28. With this configuration, it is possible to align the dividing means 28 on a line of a substantially constant temperature and hence preferably also of substantially constant impurity concentration. Thus, the impurity concentration in the second partial stream 44 and hence the efficiency of the cleaning device 46 can be further increased.

As an alternative to the embodiments of FIG. 3 or FIG. 5, the dividing means 28 can be formed, for example, as a fan-like, variably spreadable partition curtain or a lamellae device being variably spreadable in the circumferential direction over a defined angular range.

In both configurations of FIGS. 3 and 5, other parameters may be used for controlling the dividing means 28 instead of the temperature. Thus, the temperature, the impurity concentration, the volume flow and/or the pressure of the first and/or the second partial stream 42, 44 can be used as control parameters.

As also shown in FIG. 2, in addition, a cooling zone 24 is provided between the regeneration zone 22 and the separation zone 20 in the direction of rotation 26 of the separation unit 18. The area of this cooling zone 24 is dimensioned significantly smaller than the area of the separation zone 20, and preferably also smaller than the area of the regeneration zone 22.

The cooling zone 24 of the separating device 12 is preferably connected to a port 13c via which a cooling air flow 50 can be fed to the separating device 12 by means of a blower 52. After flowing through the separation unit 18, the cooling air flow 54 is discharged from the separating device 12 via a port 13d. As exemplarily shown in FIG. 1, the cooling air flow 54 after having passed through the separating device 12 is fed into the process exhaust air 10 upstream of the separating device 12. Alternatively or additionally, the cooling air flow 50 can also be separated or branched off as a partial stream from the process exhaust air 10. In particular, this is possible when the blower 52 is operated on the suction side and/or the blower 16 is provided in the process exhaust air flow 10. In this case, the cooling air can be heated up to a desorption temperature, and can preferably be used for regeneration of the separating device 12.

The cooling air flow 50 passes through the separating device 12 preferably in a direction opposite to the direction in which the process exhaust air 10 flows through the separating device 12. The cooling air flow 50 cools the separation unit 18 of the separating device 12 after a regeneration process in the regeneration zone 22 down to a temperature range of about 10 to 60° C. again in which the impurities contained in the process exhaust air 10 can attach to the filter 18.

The regeneration zone 22 of the separating device 12 on its input side is connected to a port 13e for introducing a regeneration stream 36. The regeneration stream 36 is preferably hot air which is brought to a temperature in the range of 140 to 450° C. by means of a heat exchanger 40 and blown into the separating device 12 by a blower 38.

On its output side, the regeneration zone 22 is connected to two ports 13f and 13g. More specifically, the first subzone 22a of the regeneration zone 22 is in communication with the port 13f for discharging a first partial stream 42, and the second subzone 22b of the regeneration zone 22 is in communication with the port 13g for discharging a second partial stream 44. The regeneration stream 36 passes through the separating device 12 preferably in a direction opposite to the direction in which the process exhaust air 10 flows through the separating device 12.

After the impurities of the process exhaust air 10 have attached to the separation unit 18 in the relatively cool separation zone 20, the separation unit 18 is heated in the regeneration zone 22 to enable detaching of the impurities from the separation unit 18 (desorption). As the separation unit 18 still is at a low temperature level in a first phase of this regeneration process (first subzone 22a), only few impurities are detached from the filter so that the first partial stream 42 only has a relatively low impurity concentration.

For this reason, this first partial stream 42 is separated from the regeneration stream, which is why he is also called "split stream". In the embodiment of FIG. 1, the first partial stream 42 is fed into the process exhaust air 10 upstream of the separating device 12 and hence finally returned to the separating device 12. In this way, the impurity concentration in the process exhaust air 10 is increased so that the impurity concentration in the separation unit 18 of the separating device 12 can also be increased.

As shown in FIG. 1, a flow controller 60 is optionally provided in the first partial stream line. A flow line 62 extends from this flow controller 60 to the cooling air flow 50 upstream of the separating device. The flow controller 60 is preferably variably controllable.

After the filter 18 of the separating device 12 has been exposed to the hot regeneration stream 36 in the regeneration zone 22 for a determined time period, the separation unit 18 reaches a temperature level which is sufficient for desorption of the impurities from the separation unit 18 (second subzone). Therefore, the second partial stream 44 of the regeneration stream 36 has a high impurity concentration, which is why it is also called "concentrate stream".

The second partial stream 44 is fed to a cleaning device 46 in which the impurities (e.g. organic solvents) 48 are extracted or recovered from the second partial stream 44. The cleaning device 46 is, for example, an apparatus for regenerative thermal oxidation (RTO). The efficiency of such a cleaning device 46 is higher with a higher impurity concentration in the second partial stream 44. For this reason, it is advantageous to branch off the first partial stream 42 having a relatively low impurity concentration.

Alternatively, the cleaning device 46 may also be one comprising a gas turbine aggregate. Such one is exemplary illustrated in FIG. 4 and, for example, in DE 10 2013 203 448 A1, the whole content thereof is referred to with respect to construction and operation. The gas turbine apparatus is basically a power generation system which can be used in combination with the inventive method for separating impurities from process exhaust air as a cleaning device 46 in which the second partial stream 44 or its combustible components are combusted.

Figure 4:
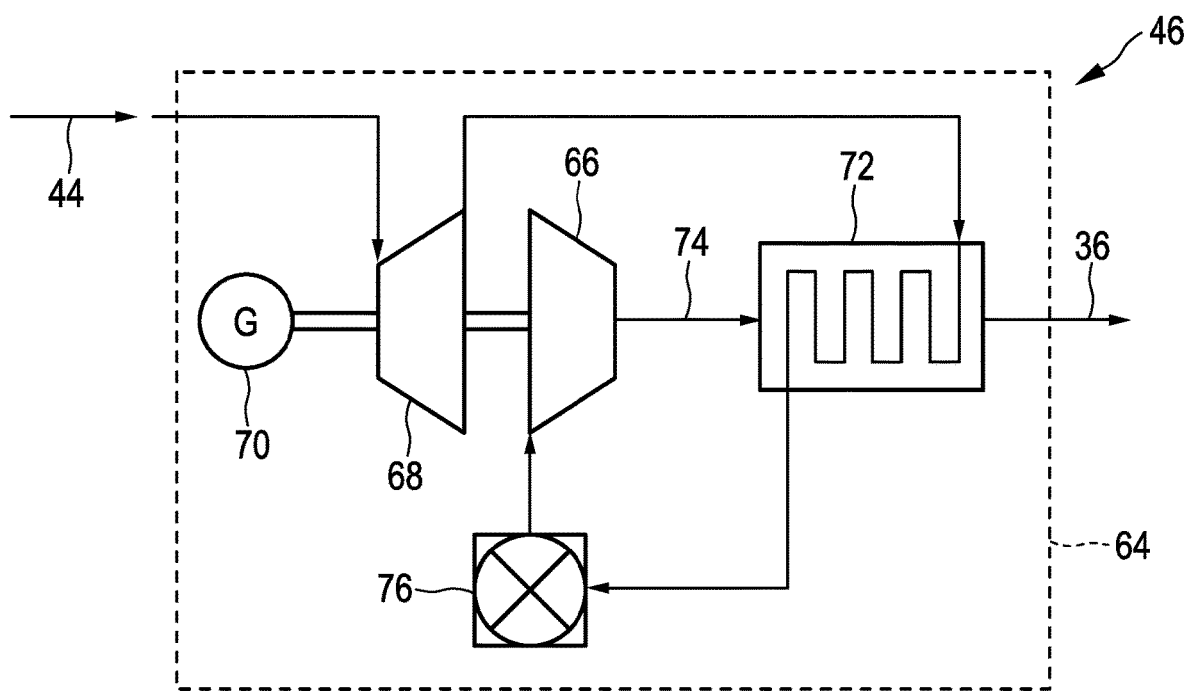
FIG. 4 shows the structure of a cleaning device comprising a gas turbine aggregate.

As shown in FIG. 4, this cleaning device 46 comprises a gas turbine aggregate 64, in particular a micro gas turbine aggregate. The gas turbine aggregate 64 includes a gas turbine 66 which is coupled to a compressor 68 and is driving a generator 70. Especially, the gas turbine 66 may be configured as so-called micro gas turbine and have the construction as described in WO 2012/089837 A1. The second partial stream 44 containing combustible components is sucked and compressed by the compressor 68. The sucked second partial stream 44 is then passed through a heat exchanger designed as a recuperator 72 in which heat is transferred from the exhaust stream of the gas turbine 66 being marked by the arrow 74 to the compressed second partial stream.

In the combustion apparatus 76, the second partial stream 44 containing combustible components is combusted along with rich gas. A combustible gas or gas mixture the calorific value HA of which is above 15 MJ/m$^3$ is referred to as so-called rich gas. The rich gas burned in the combustion apparatus 76 can be e.g. natural gas, in particular bio-natural gas.

Due to the increased impurity concentration of the second partial stream 44, the gas turbine aggregate 64 can optionally also be configured without the recuperator 72. Thus, it may be avoided that the preheating of a gaseous medium containing combustible components causes chemical pre-reactions therein before entering the combustion chamber of a burner.

While in FIG. 1 a closed regeneration circuit is illustrated, this may also be configured open in other configurations.

As shown in FIG. 1, a flow controller 56 is arranged in the second partial stream line downstream of the separating device 12. One or more further partial streams can be branched off from the second partial stream 44 by means of this flow controller 56.

In FIG. 1, three optional further partial streams are provided by way of example. One further partial stream can be fed via a first flow line 58a into the regeneration stream 36 upstream of the separating device 12, one further partial stream can be fed via a second flow line 58b into the first partial stream 42 prior to its introduction into the process exhaust air 10, and one further partial stream can be fed via a third flow line 58c into the process exhaust air 10 upstream of the separating device 12.

With these measures, the impurity concentrations in the separating device 12 and hence finally in the second partial stream 44 of the regeneration stream can be increased. As a result, the cleaning device 46 can operate more efficiently. If applicable, the cleaning device 46 can operate auto-thermal in this way, i.e. without extra energy supply.

With the construction illustrated in FIG. 1, up-concentration factors for the second partial stream 44 of up to 40:1 and more in relation to the process exhaust 10 can be achieved. Such high up-concentrations could previously be achieved only with multi-stage separating devices.

Due to the higher temperature of the second partial stream 44 (in comparison to a situation without separated first partial stream 42), in addition, the dew point may be shifted. As a result, the cleaning device 46 can also operate more efficiently.

By returning the branched off further partial streams, it is also possible to achieve a safety-related operation of the system which prevents an unacceptable increase in the concentration above the explosion limit in case of failure. Thus, a threat to the operational safety of the cleaning device can be reduced.

Further, as another advantage, buffering of concentration peaks can be enabled.

In order to optimize the operation of the entire system, one or more of the following parameters can be monitored: a temperature of the first partial stream 42, an impurity concentration of the first partial stream 42, a temperature of the second partial stream 44, an impurity concentration of the second partial stream 44, a temperature of the process exhaust air 10, an impurity concentration of the process exhaust air 10, a flow volume of the process exhaust air 10, a temperature of the regeneration stream 36, a flow volume of the regeneration stream 36, an energy balance of the cleaning device 46, a pressure of the first partial stream 42, a pressure of the second partial stream 44, a volume flow of the first partial stream 42, a flow volume of the second partial stream 44 and the like. The dividing means 28 can then be variably controlled depending on these parameters in order to adjust an area ratio between the first subzone 22a and the second subzone 22b. In this way, a flow rate of the first partial stream 42 can be variably controlled, or a flow rate ratio of the first partial stream 42 to the second partial stream 44 can be variably controlled.

Figure 6:
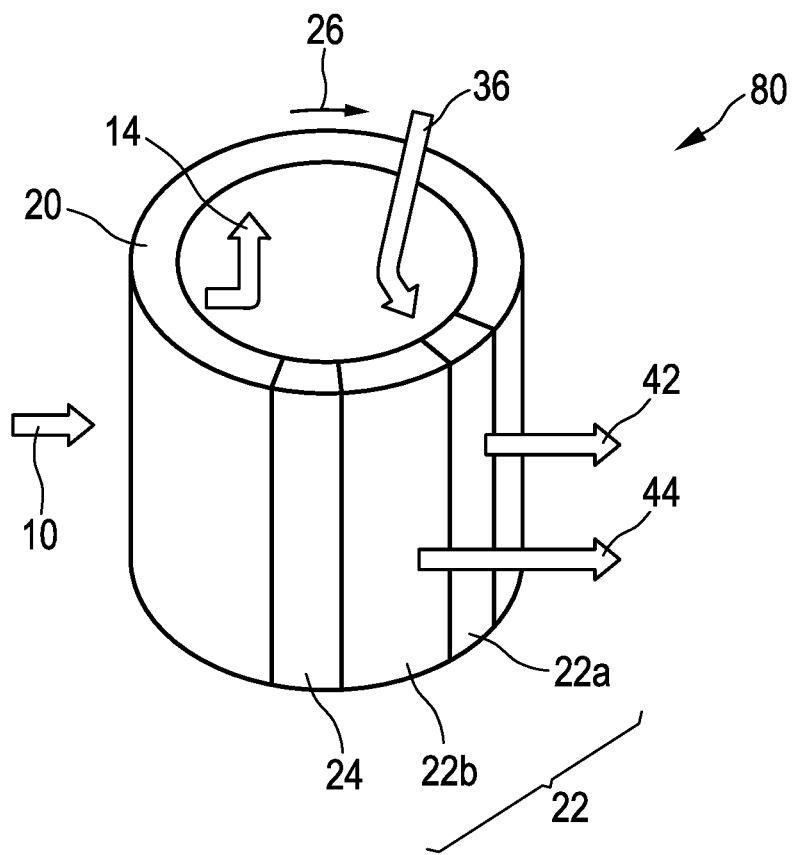
FIG. 6 is a simplified perspective view of a filter designed as a carousel of an inventive separating device, in particular filtering device, according to a preferred embodiment.
Figure 7:
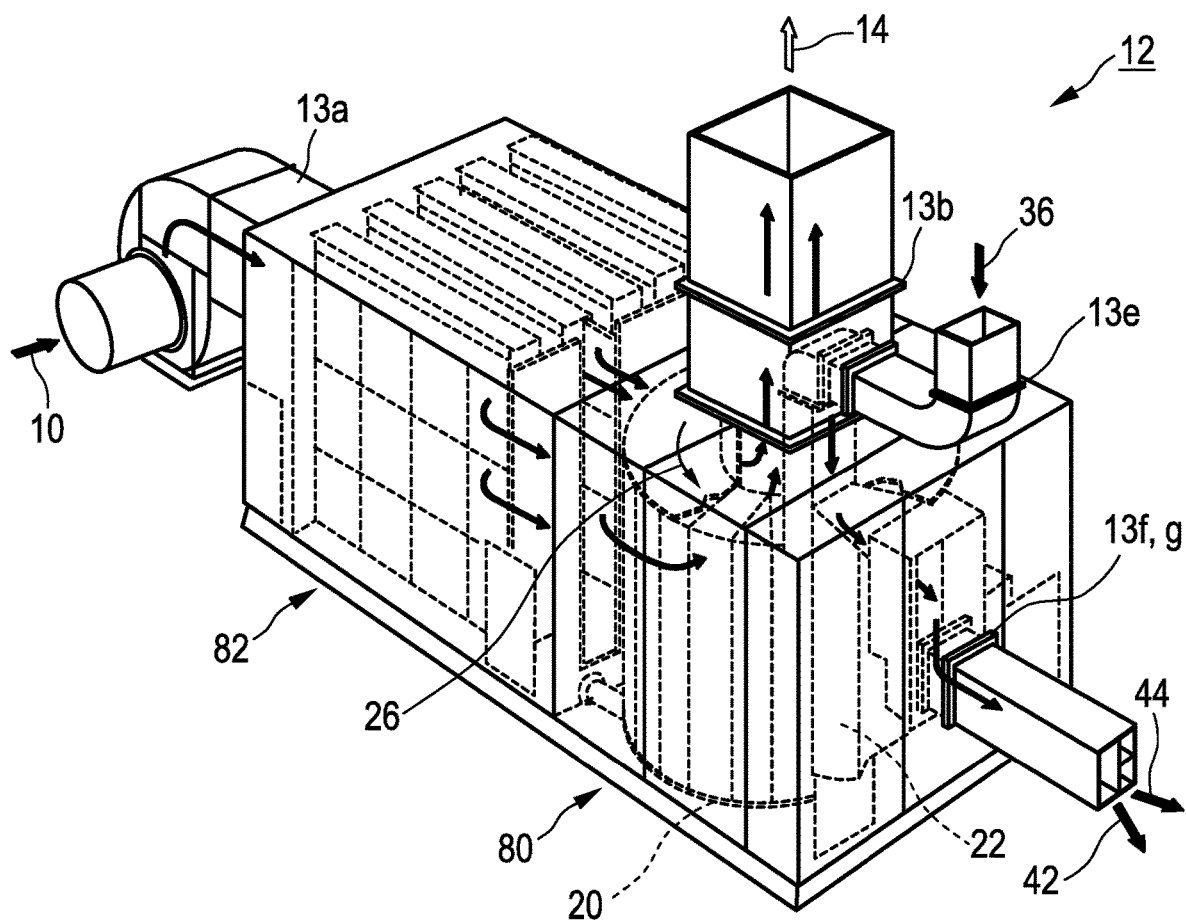
FIG. 7 is a perspective view of an inventive separating device, in particular filtering device, comprising a filter designed as a carousel, according to a preferred embodiment.
Figure 8:
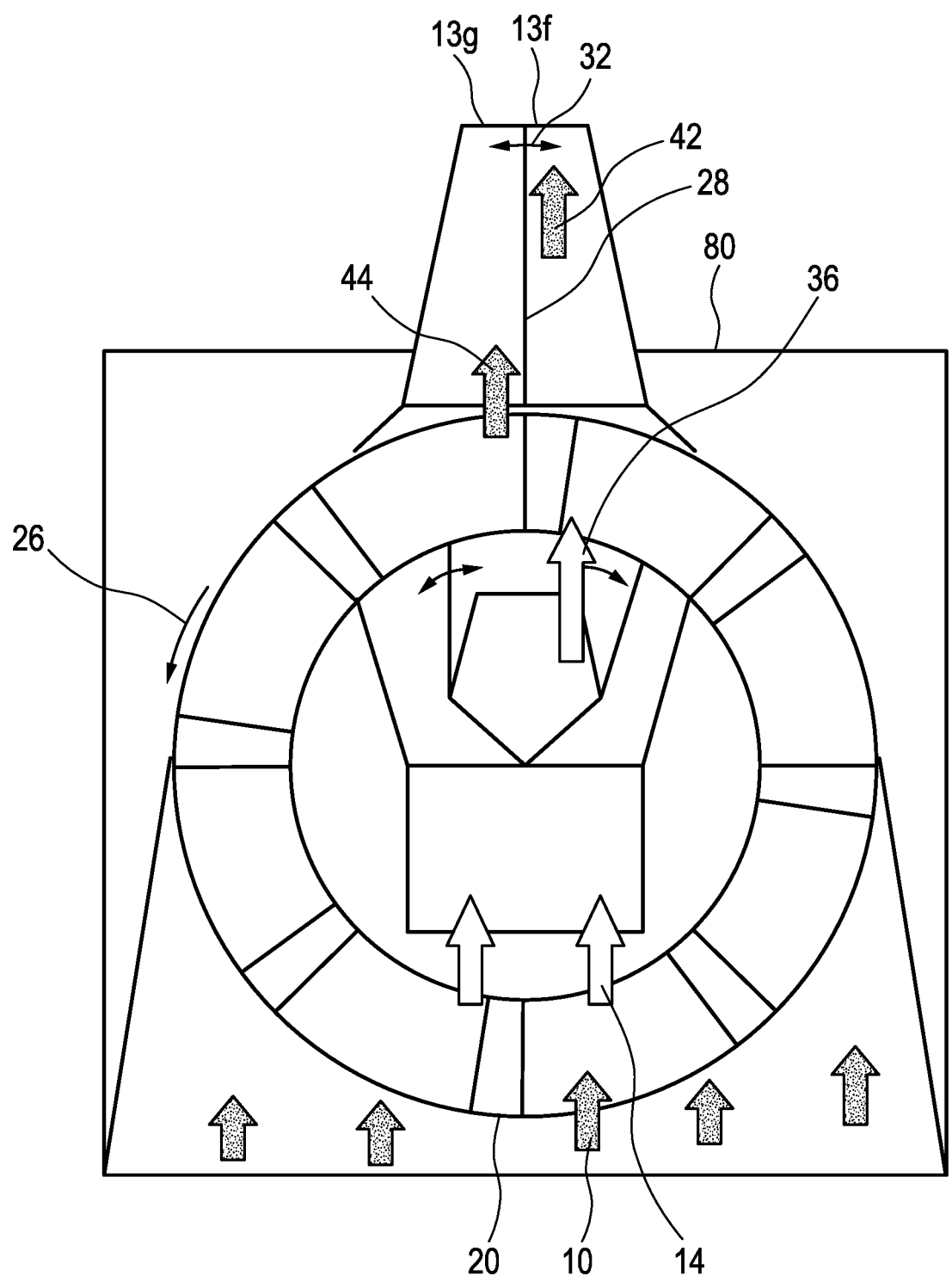
FIG. 8 is a top cut view of the filter of the separating device of FIG. 7.

Referring now to FIGS. 6 to 8, a separating device according to an alternative embodiment of the invention will be explained in more detail. The separating device 12 of the system shown in FIG. 1 may be replaced by this separating device 12 shown in FIGS. 6 to 8.

In this embodiment, the separation unit 80 of the separating device 12 is configured as a cylindrical carousel. The separation unit 80 comprises a separation zone 20, a regeneration zone 22, and an optional cooling zone 24 provided between the regeneration zone 22 and the separation zone 20 in the direction of rotation 26, which each zone having the form of a circular ring segment. The area of the regeneration zone 22 is dimensioned distinctly smaller than the area of the separation zone 20. The regeneration zone 22 is divided into a first subzone 22a and a second subzone 22b in the direction of rotation 26 of the separation unit 80, wherein the area of the first subzone 22a is dimensioned significantly smaller than the area of the second subzone 22b.

The cylindrical carousel 80 preferably has a substantially vertical or substantially horizontal axial orientation. The separating device 12 is operated continuously, i.e. the separation unit 80 is rotated so that the outer lateral surfaces of the separation zone 20 and the regeneration zone 22 are loaded by the exhaust air and regeneration streams one after the other in a direction of rotation 26.

In an alternative to the cylindrical carousel 80 shown in FIGS. 6 to 8, the carousel 80 may also be shaped as an n-gonal prism. This n-gonal prism may further preferably be formed by or be assembled from a set of prisms with a trapezoidal or triangular cross section.

The process exhaust air 10 passes radially through the separation zone 20 of the separation unit 80 and is exhausted axially from the carousel 80. The regeneration stream 36 is introduced axially into the carousel 80 and passes radially through the regeneration zone 22 of the separation unit 80 wherein it is divided into a first partial stream 42 and a second partial stream 44 by a dividing means 28. In addition, a cooling air flow 50 may pass through the optional cooling zone 24 of the separation unit 80.

Furthermore, as shown in FIG. 7, a pre-filtering unit 82 may be provided upstream of the separation unit 80. The pre-filtering unit 82 e.g. contains activated carbon. The pre-filtering unit 82 e.g. removes high-boiling material from the process exhaust air 10, whereas the separation unit 80 removes solvents from the process exhaust air 10.

In other aspects, the separation unit 80 of FIGS. 6 to 8 being designed as a carousel functions similar to the separation unit 18 of FIGS. 2, 3 and 5 being designed as a rotary disc.

While a particular embodiment of the present method and regenerative separating apparatus has been described herein, it will be appreciated by those skilled in the art that changes and modifications may be made thereto without departing from the invention in its broader aspects and as set forth in the following claims.

LIST OF REFERENCE SIGNS 10 process exhaust air
12 separating device
13a port for introducing process exhaust air
13b port for discharging clean air
13c port for introducing cooling air flow
13d port for discharging cooling air flow
13e port for introducing regeneration stream
13f port for discharging first partial stream of regeneration stream (split stream)
13g port for discharging second partial stream of regeneration stream (concentrate stream)
14 clean air
16 blower
18 separation unit (rotor-type)
20 separation zone
22 regeneration zone
22a first subzone of 22
22b second subzone of 22
24 cooling zone
26 direction of rotation
28 partition wall
30 bearing
31a, 31b bearings
32 swivel range
34a, 34b temperature sensors
36 regeneration stream
38 blower
40 heat exchanger
42 first partial stream (split stream)
44 second partial stream (concentrate stream)
46 cleaning device
48 solvent
50 cooling air flow
52 blower
54 cooling air flow after passing through filter
56 flow controller (multi-way valve, flow switch)
58a first flow line
58b second flow line
58c third flow line
60 flow controller
62 flow line
64 gas turbine aggregate
66 gas turbine
68 compressor
70 generator
72 recuperator
74 exhaust stream
76 combustion apparatus
80 separation unit (carousel-type)
82 pre-filtering unit

The invention claimed is:

1. A method for separating impurities from process exhaust air, comprising the steps of:
   passing a process exhaust air through a separating device comprising a separation unit configured as a carousel;
   regenerating said separating device by passing a regeneration stream therethrough, wherein outer lateral surfaces of said separation unit are continuously loaded by said process exhaust air and said regeneration stream;
   dividing said regeneration stream passing through said separating device during regeneration into a first partial stream having an impurity concentration less than a first predetermined limit, and a second partial stream having an impurity concentration equal to or greater than a second predetermined limit, said second predetermined limit being equal to or greater than said first predetermined limit;
   returning said first partial stream generated during regeneration to said separating device; and
   directing said second partial stream generated during regeneration to a cleaning device.

2. The method according to claim 1, wherein a flow amount of said first partial stream generated during regeneration is controlled variably.

3. The method of claim 1, wherein a ratio of the flow amount of said first partial stream generated during regeneration to the flow amount of said second partial stream generated during regeneration is controlled variably.

4. The method according to claim 1, wherein said first partial stream generated during regeneration is fed into said process exhaust air upstream of said separating device.

5. The method according to claim 1, wherein said separating device is cooled between the regeneration and the next cleaning of the process exhaust air by means of a cooling air flow, and said first partial stream generated during regeneration is fed into said cooling air flow upstream of said separating device.

6. The method according to claim 1, wherein a further partial stream is branched off from said second partial stream generated during regeneration and returned to said separating device.

7. The method according to claim 6, wherein the branched-off further partial stream flow is fed into at least one of said first partial stream, said process exhaust air and said regeneration stream.

8. The method according to claim 1, wherein said separating device is operated continuously.

9. A regenerative separating device for separating impurities from process exhaust air, comprising:
   a port for introducing a process exhaust air;
   a separation unit for receiving the impurities from said process exhaust air introduced into said separating device;

a port for discharging clean air;

a port for introducing a regeneration stream;

a divider configured for dividing said regeneration stream passed through said separation unit into a first partial stream having an impurity concentration less than a first predetermined limit, and a second partial stream having an impurity concentration equal to or greater than a second predetermined limit, wherein said second predetermined limit is equal to or greater than said first predetermined limit;

a port for discharging said first partial stream; and a port for discharging said second partial stream, wherein said separation unit is configured as a carousel, and wherein outer lateral surfaces of said separation unit are continuously loaded by said process exhaust air and said regeneration stream.

10. The separating device according to claim 9, wherein said divider is configured to variably control a flow amount of said first partial stream.

11. The separating device according to claim 9, further comprising a circular or polygonal ring segment-shaped separation zone and a circular or polygonal ring segment-shaped regeneration zone, wherein said separation zone and said regeneration zone do not overlap each other, and said dividing means divides said regeneration zone into a first subzone and a second subzone in a circumferential direction of said carousel-type separation unit.

12. The separating device according to claim 9, further comprising a port for introducing a cooling air flow and a port for discharging said cooling air flow after passing through said separation unit.

13. A system for separating impurities from process exhaust air, comprising:

a regenerative separating device according to claim 9; and a cleaning device for extracting the impurities from said second partial stream generated during a regeneration process of said separating device.

14. The system according to claim 13, further comprising a flow line for returning said first partial stream generated during a regeneration process to said separating device.

15. The system according to claim 13, further comprising a flow controller for branching off a further partial stream from said second partial stream generated during a regeneration process, and at least one flow line for returning said further partial stream to said separating device.

16. The system according to claim 13, wherein said cleaning device is configured for regenerative thermal oxidation (RTO), direct thermal oxidation (TO), recuperative catalytic oxidation (CO), regenerative catalytic oxidation (RCO), condensation or comprises a gas turbine aggregate having a combustion apparatus for combusting the combustible components of said second partial stream.

* * * * *